(12) United States Patent
Ahn et al.

(10) Patent No.: US 11,892,881 B2
(45) Date of Patent: Feb. 6, 2024

(54) DISPLAY DEVICE

(71) Applicants: SAMSUNG DISPLAY CO., LTD., Yongin-si (KR); AUFLEX CO., LTD., Hwaseong-si (KR)

(72) Inventors: Sung Sang Ahn, Hwaseong-si (KR); Hyun Min Park, Suwon-si (KR); Tae An Seo, Hwaseong-si (KR); Tae Hoon Yang, Yongin-si (KR)

(73) Assignees: SAMSUNG DISPLAY CO., LTD., Yongin-si (KR); AUFLEX CO., LTD., Hwaseong-si (KR)

( * ) Notice: Subject to any disclaimer, the term of this patent is extended or adjusted under 35 U.S.C. 154(b) by 0 days.

(21) Appl. No.: 17/888,575

(22) Filed: Aug. 16, 2022

(65) Prior Publication Data

US 2023/0152857 A1 May 18, 2023

(30) Foreign Application Priority Data

Nov. 16, 2021 (KR) .................. 10-2021-0157206

(51) Int. Cl.
*G06F 1/16* (2006.01)

(52) U.S. Cl.
CPC .......... *G06F 1/1652* (2013.01); *G06F 1/1624* (2013.01); *G06F 1/1656* (2013.01)

(58) Field of Classification Search
CPC .... G06F 1/1652; G06F 1/1624; G06F 1/1656; G09F 9/301; H10K 77/111; H10K 2102/311
See application file for complete search history.

(56) References Cited

U.S. PATENT DOCUMENTS

| 10,019,036 | B2* | 7/2018 | Sun | G06F 1/1652 |
| 11,546,986 | B2* | 1/2023 | Wang | H05K 1/028 |
| 2008/0018631 | A1* | 1/2008 | Hioki | G02F 1/133526 345/206 |
| 2015/0055287 | A1* | 2/2015 | Seo | G06F 1/1641 361/679.27 |

(Continued)

FOREIGN PATENT DOCUMENTS

| KR | 10-2018-0040181 | 4/2018 |
| KR | 10-2019-0032688 | 3/2019 |

(Continued)

*Primary Examiner* — Rockshana D Chowdhury
(74) *Attorney, Agent, or Firm* — F. Chau & Associates, LLC

(57) ABSTRACT

A display device includes: a bendable display panel including a flat area and bendable areas; and a support module disposed on the display panel, wherein the support module supports the display panel, wherein the support module includes a support plate and joints, wherein the support plate overlaps the flat area and the bendable areas and includes lattice pattern areas including lattice patterns, and wherein the joints are disposed on the support plate, are disposed to overlap with the bendable areas, and are spaced apart from one another in the first direction. Each of the joints has a top surface and a bottom surface, wherein the top surface is disposed on the support plate, and the bottom surface is opposite to the top surface, and a width of each of the top surfaces of the joints is less than a width of each of the bottom surfaces of the joints.

20 Claims, 15 Drawing Sheets

(56) References Cited

U.S. PATENT DOCUMENTS

| | | | | |
|---|---|---|---|---|
| 2015/0370287 | A1* | 12/2015 | Ko | H04M 1/0268 |
| | | | | 361/749 |
| 2016/0118616 | A1* | 4/2016 | Hiroki | H10K 77/111 |
| | | | | 257/40 |
| 2017/0262022 | A1* | 9/2017 | Choi | G06F 1/1652 |
| 2018/0190936 | A1* | 7/2018 | Lee | B32B 25/20 |
| 2019/0207141 | A1* | 7/2019 | Kim | H10K 77/111 |
| 2023/0164931 | A1* | 5/2023 | Wang | G06F 1/1652 |
| | | | | 361/807 |

FOREIGN PATENT DOCUMENTS

| | | |
|---|---|---|
| KR | 10-2019-0062855 | 6/2019 |
| KR | 10-2020-0099054 | 8/2020 |
| KR | 10-2021-0007773 | 1/2021 |

* cited by examiner

PNL: PNL_1, PNL_2, PNL_3, SBA
2000: 2100, 2200
2200: 2210, 2220, 2230

PNL: PNL_1, PNL_2, PNL_3
2000: 2100, 2200
2100: 2110, 2120, 2130
2200: 2210, 2220, 2230
2120: LPR, ADR
2130: LPR, ADR
2220: SG
2230: SG
SG: SGa, SGb

PNL: PNL_1, PNL_2, PNL_3
2003: 2100, 2203
2100: 2110, 2120, 2130
2203: 2210, 2223, 2233
2120: LPR, ADR
2130: LPR, ADR
2223: SG3
2233: SG3
SG3: SG3a, SG3b

DISPLAY DEVICE

CROSS-REFERENCE TO RELATED APPLICATION

This application claims priority under 35 U.S.C. § 119 to Korean Patent Application No. 10-2021-0157206 filed on Nov. 16, 2021 in the Korean Intellectual Property Office, the disclosure of which is incorporated by reference herein in its entirety.

TECHNICAL FIELD

The present invention relates to a display device, and more particularly to, a slidable display device.

DISCUSSION OF THE RELATED ART

Display devices are becoming more integrated in society with developments in multimedia technology. Accordingly, various display devices such as an organic light-emitting diode (OLED) display device, a liquid crystal display (LCD) device, and the like have been used.

Recently, display technology has been under development, and research has been vigorously conducted on flexible displays. Generally, flexible displays can be folded, bent, or slid to expand or reduce the size of their display screens and can thus contribute greatly to reducing the size of display devices and diversifying the design of display devices.

In addition, typically, there may be provided a metallic support plate and a metallic multi-joint structure for support below a flexible display of a slidable display device.

SUMMARY

According to an embodiment of the present invention, a display device includes: a display panel including a flat area and bendable areas, which are adjacent to the flat area in a first direction, wherein the display panel is configured to be bendable; and a support module disposed on the display panel, wherein the support module supports the display panel, wherein the support module includes a support plate and a plurality of joints, wherein the support plate is disposed to overlap with the flat area and the bendable areas and includes a plurality of lattice pattern areas including lattice patterns, and wherein the plurality of joints are disposed on a bottom surface of the support plate, are disposed to overlap with the bendable areas, and are spaced apart from one another in the first direction, each of the plurality of joints has a top surface and a bottom surface, wherein the top surface is disposed on the bottom surface of the support plate, and the bottom surface is opposite to the top surface, and a width, in the first direction, of each of the top surfaces of the plurality of joints is less than a width, in the first direction, of each of the bottom surfaces of the plurality of joints.

In an embodiment of the present invention, the support plate includes a flat support area and pattern support areas, wherein the flat support area overlaps with the flat area of the display panel, and wherein the pattern support areas overlap with the bendable areas of the display panel, and each of the pattern support areas includes the plurality of lattice pattern areas and joint attachment areas, wherein each of the pattern support areas include the lattice patterns, and wherein the joint attachment areas are disposed between the plurality of lattice pattern areas.

In an embodiment of the present invention, each of the lattice patterns includes a plurality of slits, which penetrate the support plate, and the plurality of joints overlap with the joint attachment areas, but not with the plurality of lattice pattern areas.

In an embodiment of the present invention, the support plate includes a metal or a polymer material.

In an embodiment of the present invention, the support plate has a thickness of about 0.05 mm to about 0.3 mm.

In an embodiment of the present invention, the joints include attachment parts and body parts, wherein the attachment parts are adjacent to the support plate, and where the body parts are disposed below the attachment parts, wherein a width, in the first direction, of the attachment parts is substantially the same as a width, in the first direction, of the top surfaces of the joints, and wherein a width, in the first direction, of the body parts is substantially the same as a width, in the first direction, of the bottom surfaces of the joints.

In an embodiment of the present invention, the body parts of the plurality of joints are spaced apart from one another by a (1_1)-th width in the flat area of the display panel, and the attachment parts of the plurality of joints are spaced apart from one another by a (1_2)-th width, which is greater than the (1_1)-th width.

In an embodiment of the present invention, the body parts of the plurality of joints are spaced apart from one another by a (2_1)-th width, which is less than the (1_1)-th width, as the support plate is being bent in the bendable areas.

In an embodiment of the present invention, the width, in the first direction, of the attachment parts is about 0.2 mm to about 1.5 mm.

According to an embodiment of the present invention, a display device includes: a display panel including a first area and a second area, which is disposed on a first side, in a first direction, of the first area; and a support module disposed on a first surface of the display panel, wherein the support module includes a support plate and a plurality of joints, wherein the support plate is disposed to overlap with the first and second areas, includes lattice patterns, and extends in the first direction and a second direction crossing the first direction, wherein the plurality of joints are integrally formed with the support plate and protrude from the support plate in a third direction substantially perpendicular to the first and second directions, wherein the plurality of joints overlap with the second area, extend in the second direction, and are spaced apart from one another in the first direction, wherein the lattice patterns of the support plate are disposed between the plurality of joints, wherein the joints have top surfaces and bottom surfaces, wherein the top surface are interfaces between the support plate and the plurality of joints, and the bottom surfaces are opposite to the top surfaces in the third direction, and wherein a width, in the first direction, of the top surfaces is less than a width, in the first direction, of the bottom surfaces.

In an embodiment of the present invention, each of the lattice patterns includes a plurality of slits, which penetrate the support plate, and the joints do not overlap with the lattice patterns.

In an embodiment of the present invention, the support plate includes a metal or a polymer material.

In an embodiment of the present invention, the support plate has a thickness of about 0.05 mm to about 0.3 mm.

In an embodiment of the present invention, the joints include attachment parts and body parts, wherein the attachment parts are adjacent to the support plate, and the body parts are disposed on the attachment parts, a width, in the first direction, of the attachment parts is substantially the same as a width, in the first direction, of the top surfaces of the joints, and a width, in the first direction, of the body parts is substantially the same as a width, in the first direction, of the bottom surfaces of the joints.

In an embodiment of the present invention, a distance between the body parts of the joints is less than a distance between the attachment parts of the joints.

In an embodiment of the present invention, the distance between the body parts of the joints is less in a bent area of the display panel than in an area of the display panel that is not bent.

In an embodiment of the present invention, the display panel further includes a third area and a fourth area, wherein the third area is disposed on a second side, opposite the first side, of the first area, and the fourth area is disposed on a third side, in the second direction, of the first area, the support plate is disposed to overlap with the first, second, and third areas, and the joints are disposed to overlap with the second and third areas.

According to an embodiment of the present invention, a display device includes: a display panel; a support plate attached on a bottom surface of the display panel, wherein the support plate includes lattice patterns; and a plurality of joints integrally formed with the support plate and protruding from the support plate, wherein the joints are spaced apart from one another, wherein the joints do not overlap with the lattice patterns of the support plate and have top surfaces and bottom surfaces, wherein the top surfaces are interfaces between the support plate and the joints, and the bottom surfaces are opposite to the top surfaces, and a width of each of the top surfaces is less than a width of each of the bottom surfaces.

According to an embodiment of the present invention, the support plate includes a metal or a polymer material and has a thickness of about 0.05 mm to about 0.3 mm.

According to an embodiment of the present invention, the bottom surfaces of the joints are spaced apart from one another by a (1_1)-th width, and the top surfaces of the joints are spaced apart from one another by a (1_2)-th width, which is greater than the (1_1)-th width.

BRIEF DESCRIPTION OF THE DRAWINGS

The above and other features of the present invention will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which preferred embodiments of the present invention are shown. This present invention may, however, be embodied in different forms and should not be construed as being limited to the embodiments set forth herein.

It will also be understood that when a layer is referred to as being "on" another layer or substrate, it can be directly on the other layer or substrate, or intervening layers may also be present. The same reference numbers indicate the same components throughout the specification, and thus, repetitive descriptions may be omitted.

It will be understood that, although the terms "first," "second," etc. may be used herein to describe various elements, these elements should not be limited by these terms. These terms are only used to distinguish one element from another element. For instance, a first in element discussed below could be termed a second element without departing from the spirit and scope of the present invention. Similarly, the second element could also be termed the first element.

Features of each of various embodiments of the present invention may be partially or entirely combined with each other and may technically and variously interwork with each other, and respective embodiments may be implemented independently of each other or may be implemented together in association with each other.

Hereinafter, embodiments of the present invention will be described with reference to the attached drawings.

Figure 1:
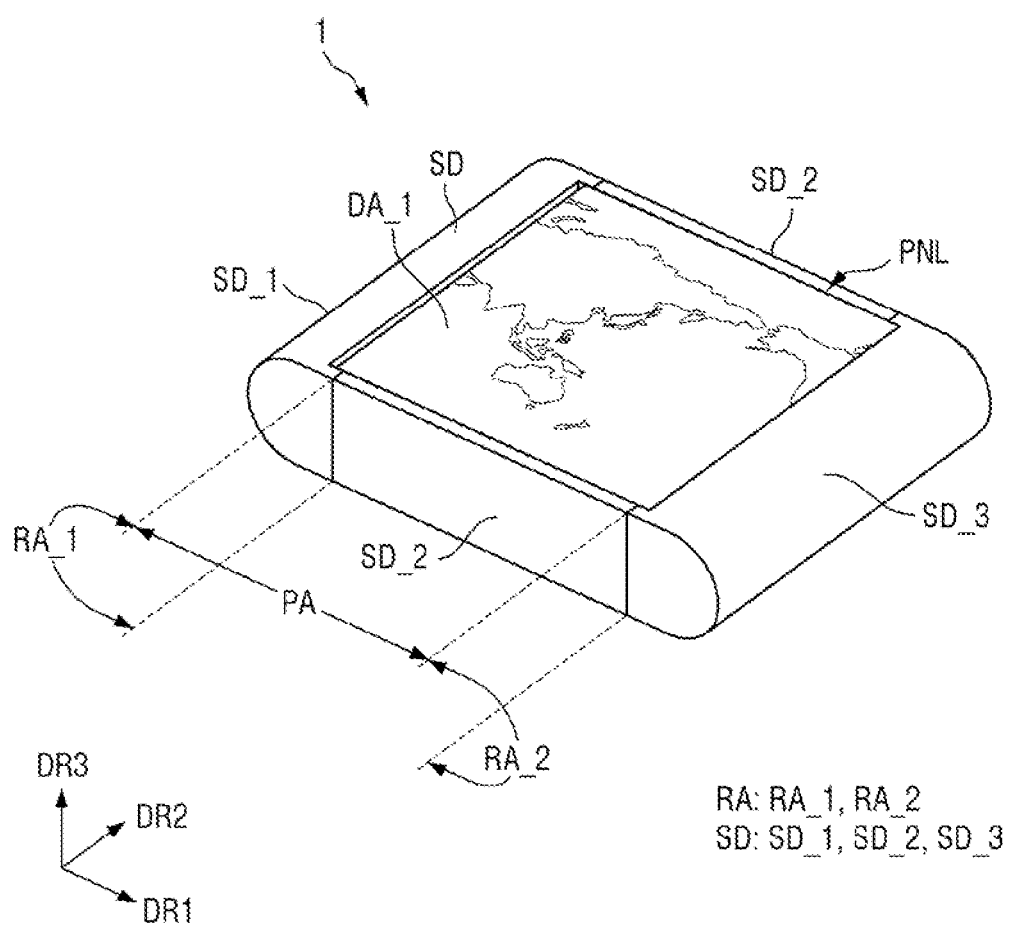
FIG. 1 is a perspective view illustrating a display device according to an embodiment of the present invention.
Figure 2:
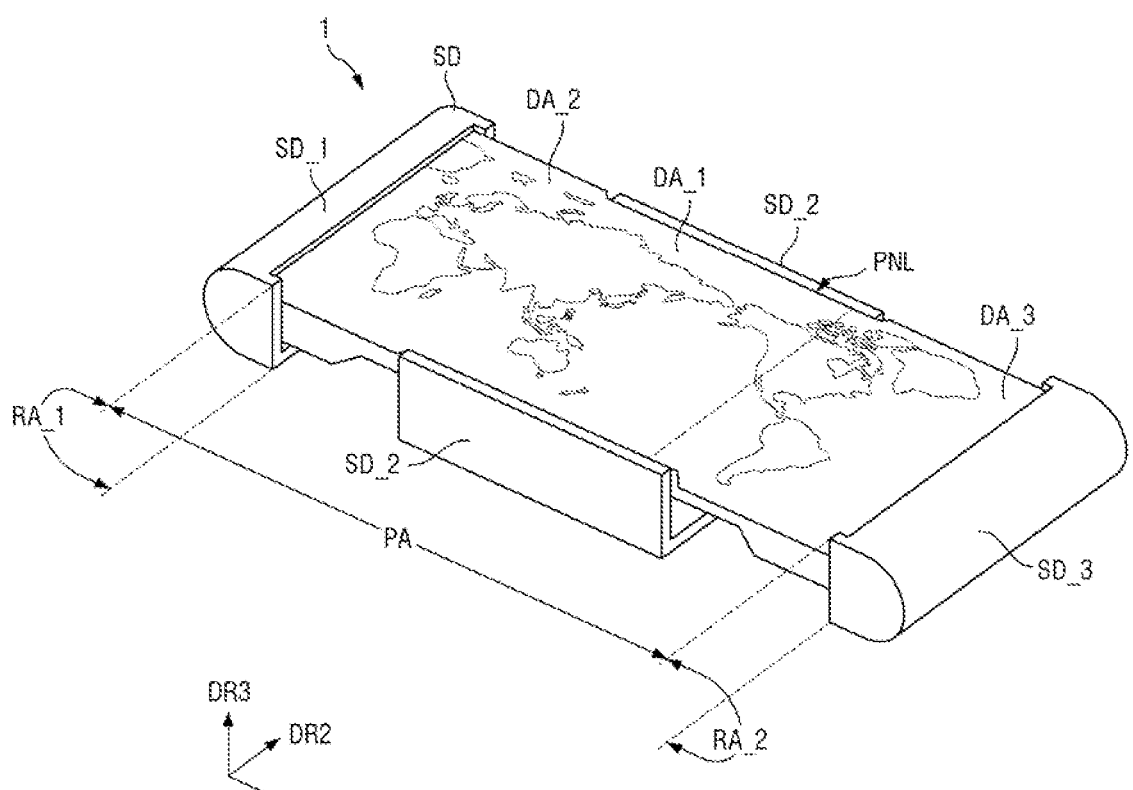
FIG. 2 is a perspective view illustrating the display device of FIG. 1 in its expanded state.
Figure 3:
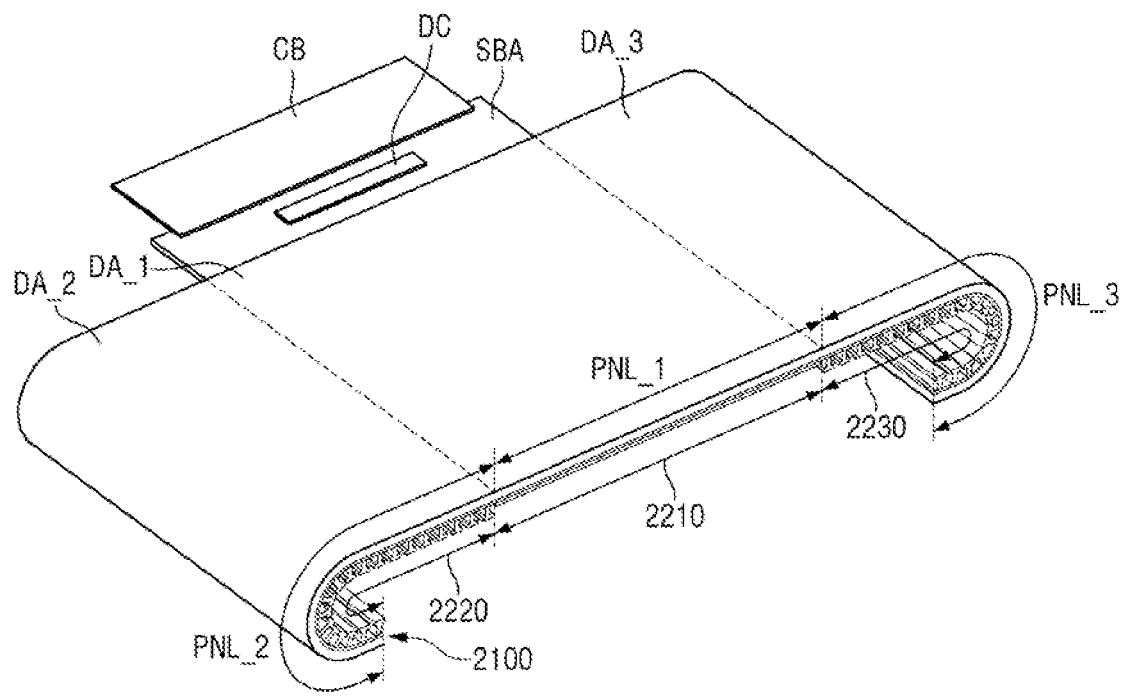
FIG. 3 is a perspective view illustrating the layout of a display panel and a support module of the display device of FIG. 1.
Figure 3:
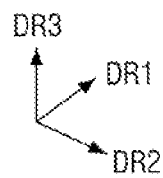

FIG. 1 is a perspective view illustrating a display device according to an embodiment of the present invention. FIG. 2 is a perspective view illustrating the display device of FIG. 1 in its expanded state. FIG. 3 is a perspective view illustrating the layout of a display panel and a support module of the display device of FIG. 1.

Referring to FIGS. 1 and 2, a display device 1 may be a sliding or slidable display device. For example, the display device 1 may be a multi-slidable display device that is slidable in both directions, but the present invention is not limited thereto. For example, the display device 1 may be a single-slidable display device that is slidable only in one direction. The display device 1 will hereinafter be described as being a multi-slidable display device.

The display device 1 may have a three-dimensional (3D) shape. For example, the display device 1 may have a rectangular shape or a 3D shape similar to a rectangular shape. For example, the display device 1 may have a rectangular center portion and two rounded side portions, and the rectangular center portion may be between the two rounded side portions. A direction parallel to a first side (or, e.g., a first horizontal side or an X-axis direction) of the display device 1 may be referred to as a first direction DR1. A direction parallel to a second side (or, e.g., a second horizontal side or a Y-axis direction) of the display device 1 may be referred to as a second direction DR2, and the thickness direction of the display device 1 may be referred to as a third direction DR3. Unless otherwise specified, a particular direction may refer to both sides in the particular direction. If there is the need to distinguish one side from the other side in the particular direction, one side in the particular direction may be referred to as a first side, and the other side in the particular direction may be referred to as a second side. Referring to FIG. 1, a direction indicated by an arrow may be referred to as a first side, and the opposite direction thereof may be referred to as a second side. The first and second directions DR1 and DR2 may be perpendicular to each other, the first and third directions DR1 and DR3 may be substantially perpendicular to each other, and the second and third directions DR2 and DR3 may be substantially perpendicular to each other.

The display device 1 may include a flat area PA and bendable areas RA. The flat area PA of the display device 1 may overlap an area in which a display panel PNL of a panel container SD is exposed. The bendable areas RA of the display device 1 may be formed on the inside of the panel container SD. The bendable areas RA may be bent with a predetermined curvature radius and may be areas where the display panel PNL is bent in accordance with the predetermined curvature radius. The bendable areas RA may be disposed on both sides (e.g., opposing sides), in the first direction DR1, of the flat area PA. For example, a first bendable area RA_1 may be disposed on a second side, in the first direction DR1, of the flat area PA, and a second bendable area RA_2 may be disposed on a first side, in the first direction DR1, of the fat area PA. The first bendable area RA_1 may be an area where a second area PNL_2 of the display panel PNL is bent, and the second bendable area RA_2 may be an area where a third area PNL_3 of the display panel PNL is bent. As the display device 1 is expanded, the area of the flat area PA may increase. Accordingly, the distance between the first and second bendable areas RA_1 and RA_2 may increase.

Referring to FIGS. 1 through 3, the display device 1 may include the display panel PNL, a support module 2000, and the panel container SD.

Any type of display panel such as an organic light-emitting display panel including an organic light-emitting layer, a micro-light-emitting diode (microLED) display panel using microLEDs, a quantum-dot light-emitting diode display panel using a quantum-dot light-emitting layer, or an inorganic light-emitting display panel using inorganic light-emitting element may be applicable to the display panel PNL, which is a panel for displaying an image.

The display panel PNL may be a flexible panel. The display panel PNL may be flexible enough to be rollable, bendable, or foldable in part in the panel container SD. The display panel PNL may be slidable along the first direction DR1.

The display panel PNL may include a first area PNL_1, second area PNL_2, and a third area PNL_3. The first area PNL_1 is supported by a first support member 2210 of the support module 2000. The second area PNL_2 is supported by a second support member 2220 of the support module 2000, and the third area PNL_3 is supported by a third support member 2230 of the support module 2000. The first area PNL_1 of the display panel PNL may be always flat regardless of the sliding of the display panel PNL. The second and third areas PNL_2 and PNL_3 of the display panel PNL may be areas that are already rolled, bent, or folded or rollable, bendable, or foldable in accordance with the sliding of the display panel PNL.

Referring to FIG. 3, a first surface, facing the third direction DR3, of the display panel PNL may be the top surface of the display panel PNL, and a second surface, facing a direction opposite to the third direction DR3, of the display panel PNL may be the bottom surface of the display panel PNL where the support module 2000 is disposed.

The display area DA of the display panel PNL may be classified into first, second, and third display areas DA_1, DA_2, and DA_3 depending on whether and the degree to which the display panel PNL is slid open. The second and third display areas DA_2 and DA_3 may appear depending on whether and the degree to which the display panel PNL is slid open. For example, in a first state, in which the display device 1 is not slid open, the display panel PNL may include the first display area DA_1 having a first area. In a second state, in which the display device 1 is slid open, the display panel PNL may further include the second and third display areas DA_2 and DA_3, which are extensions from the first display area DA_1.

The second display area DA_2 may be an area where the second area PNL_2 of the display panel PNL and the flat area PA overlap with each other, and the third display area DA_3 may be an area where the third area PNL_3 of the display panel PNL and the flat area PA overlap with each other.

The areas of the second and third display areas DA_2 and DA_3 may vary depending on the degree to which the display panel PNL is slid open. When the display device 1 is slid open completely, the second and third display areas DA_2 and DA_3 may have second and third areas, respectively, and the display area DA may have a fourth area, which is the sum of the first, second, and third areas. Here, the fourth area may be the maximum area of the display area DA.

The first display area DA_1 may overlap with the first area PNL_1 of the display panel PNL. The second display area DA_2 may overlap with at least part of the second area PNL_2 of the display panel PNL. The third display area DA_3 may overlap with at least part of the third area PNL_3 of the display panel PNL. The boundary between the first and second display areas DA_1 and DA_2 may overlap with the boundary between the first and second areas PNL_1 and PNL_2, and the boundary between the first and third display areas DA_1 and DA_3 may overlap with the boundary between the first and third areas PNL_1 and PNL_3. However, the present invention is not limited to this.

The display panel PNL may further include a subarea SBA. The subarea SBA may be disposed on one side, in the second direction DR2, of the first area PNL_1 of the display panel PNL. The subarea SBA may be an area that is foldable or bendable. In a case where the subarea SBA is bent, the subarea SBA may overlap with the first area PNL_1 in the third direction DR3. The subarea SBA may have a rectangular shape in a plan view, but the present invention is not limited thereto.

The length, in the first direction DR1, of the subarea SBA may be substantially the same as the length, in the first direction DR1, of the first area PNL_1. In addition, the length, in the first direction DR1, of the subarea SBA may be less than the length, in the first direction DR1, of the first area PNL_1. The length, in the second direction DR2, of the subarea SBA may be less than the length, in the second direction DR2, of the first area PNL_1, but the present invention is not limited thereto.

A driving circuit DC and a circuit board CB may be disposed on one surface, in the third direction DR3, of the subarea SBA. For example, the circuit board CB may be attached on the subarea SBA via an anisotropic conductive film (ACF). The circuit board may be electrically connected to a pad unit formed on the subarea SBA. The circuit board CB may be a flexible film such as a printed circuit board (PCB), a flexible PCB (FPCB), or a chip-on-film (COF). The driving circuit DC may be formed as an integrated circuit (IC) and may be attached on the subarea SBA in a chip-on-glass (COG) manner, or a chip-on-plastic (COP) manner, or an ultrasonic manner. In addition, the driving circuit DC may be attached on the circuit board CB.

The support module 2000 may be attached on the bottom surface of the display panel PNL to support the display panel PNL and may assist with the sliding, in the first direction DR1, of the display panel PNL. The support module 2000 may include a support plate 2100 and first, second, and third support members 2210, 2220, and 2230. The support plate 2100 is disposed on the bottom surface of the display panel PNL. The first, second and third support members 2210, 2220 and 2230 are disposed on the bottom surface of the support plate 2100. The support module 2000 will be described later in detail.

The panel container SD may accommodate the display panel PNL and at least part of the support module 2000 therein. The panel container SD may include a first bent part SD_1, a second bent part SD_3, and sidewall parts SD_2. The first bent part SD_1 includes the first bendable area RA_1. The second bent part SD_3 includes the second bendable area RA_2, and sidewall parts SD_2 connect the first and second bent parts SD_1 and SD_3 to each other. Rails may be formed on the inside of the first bent part SD_1, the second bent part SD_3, and the sidewall parts SD_2 and may thus guide the sliding of the display panel PNL.

The structure of the support module 2000 will hereinafter be described.

Figure 4:
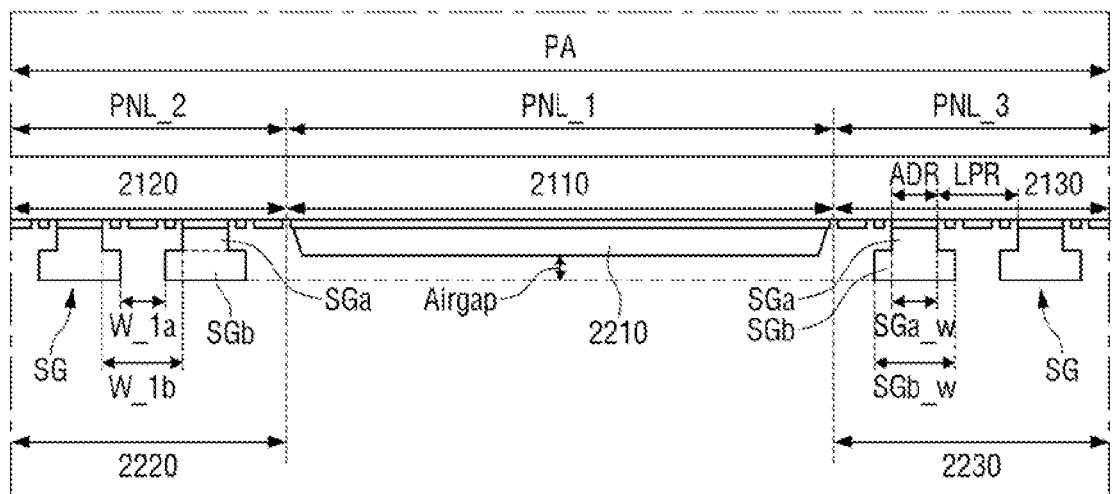
FIG. 4 is a cross-sectional view illustrating the display panel and the support module of the display device of FIG. 1.
Figure 4:
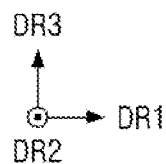
Figure 5:
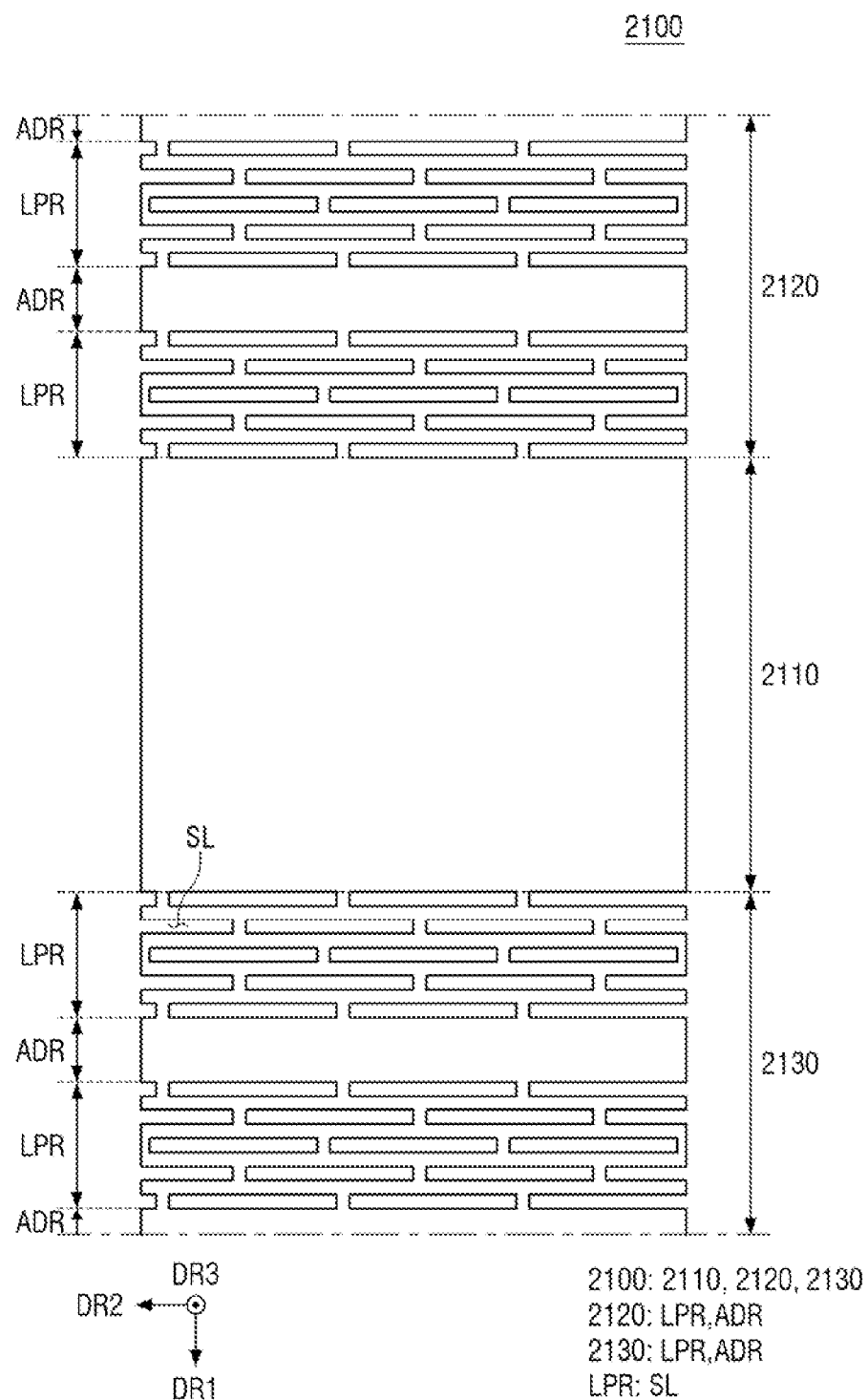
FIG. 5 is a plan view of a support plate of the support module of the display device of FIG. 1, as viewed in a third direction.
Figure 6:
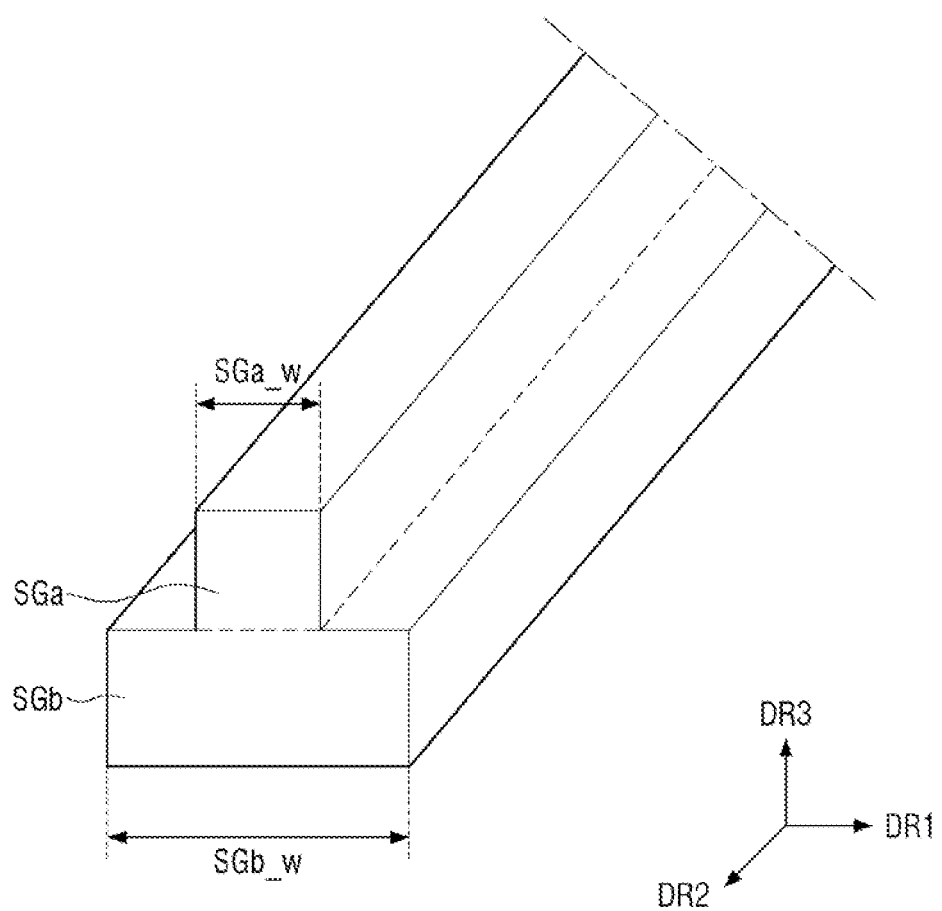
FIG. 6 is a perspective view of a joint of the support module of the display device of FIG. 1.

FIG. 4 is a cross-sectional view illustrating the display panel and the support module of the display device of FIG. 1. FIG. 5 is a plan view of the support plate of the support module of the display device of FIG. 1, as viewed in a third direction. FIG. 6 is a perspective view of a joint of the support module of the display device of FIG. 1.

Referring to FIGS. 4 through 6, the support module 2000 of the display device 1 may include the support plate 2100 and the first, second, and third support members 2210, 2220, and 2230, which are disposed on the bottom surface of the support plate 2100. The support plate 2100 is disposed on the bottom surface of the display panel PNL, The support plate 2100 may support the bottom surface of the display panel PNL and may assist with the sliding of the display panel PNL. The support plate 2100 may be disposed on the bottom surface of the display panel PNL. Referring to FIGS. 4 and 5, a first surface, facing in the third direction DR3, of the support plate 2100 may be the top surface of the support plate 2100 that is attached to the bottom surface of the display panel PNL, and a second surface, opposite to the first surface, of the support plate 2100 may be the bottom surface of the support plate 2100 where the first, second, and third support members 2210, 2220, and 2230 are attached. An adhesive layer may be interposed between the display panel PNL and the support plate 2100 so that the display panel PNL and the support plate 2100 may be bonded together. The support plate 2100 may be bent or slide inside the display device 1 in accordance with the behavior of the display panel PNL.

The support plate 2100 may include a metal such as SUS340 or a polymer material such as polyurethane. The support plate 2100 may be formed to have a substantially uniform width in the third direction DR3 (or, e.g., thickness) along the profile of the display panel PNL. The support plate 2100 may be thin enough to be bendable in accordance with the behavior of the display panel PNL. The thickness of the support plate 2100 may be about 0.05 mm to about 0.3 mm, but the present invention is not limited thereto.

The support plate 2100 may include a flat support area 2110, a first pattern support area 2120, and a second pattern support area 2130. The flat support area 2110 may bean area where lattice patterns are not formed, and the first and second pattern support areas 2120 and 2130 may be areas where lattice patterns are formed. The flat support area 2110 may be disposed between the first and second pattern support areas 2120 and 2130. The support plate 2100 may have a substantially uniform thickness from one area to another area thereof. In other words, the thickness of the support plate 2100 in the flat support area 2110 may be substantially the same as the thickness of the support plate 2100 in the first and second pattern support areas 2120 and 2130.

The flat support area 2110 of the support plate 2100 may support the first area PNL_1 of the display panel PNL. The flat support area 2110 may be disposed on the bottom surface of the first area PNL_1 of the display panel PNL. The flat support area 2110 may have substantially the same shape as the first area PNL_1 in a plan view. For example, the flat support area 2110 may have a rectangular shape, a rectangle-like shape extending in the first and second directions DR1 and DR2 in a plan view or another polygonal shape, but the invention is not limited thereto.

The first pattern support area 2120 of the support plate 2100 may support the second area PNL_2 of the display panel PNL. The first pattern support area 2120 may be disposed on the bottom surface of the second area PNL_2. The first pattern support area 2120 may be disposed on a second side, in the first direction DR1, of the flat support area 2110. In a case where the second area PNL_2 is bent in the first bendable area RA_1, the first pattern support area 2120 may be bent together with the second area PNL_2.

The second pattern support area 2130 of the support plate 2100 may support the third area PNL_3 of the display panel PNL. The second pattern support area 2130 may be disposed on the bottom surface of the third area PNL_3. The second pattern support area 2130 may be disposed on a first side, in the first direction DR1 and opposite to the second side, of the flat support area 2110. In a case where the third area PNL_3 is bent in the second bendable area RA_2, the second pattern support area 2130 may be bent together with the third area PNL_3.

Referring to FIG. 5, each of the first and second pattern support areas 2120 and 2130 may include a plurality of lattice pattern areas LPR and a plurality of joint attachment areas ADR. The plurality of lattice patterns areas LPR is where lattice patterns are formed, and the plurality of joint attachment areas ADR is where lattice patterns are not formed. The lattice pattern areas LPR and the joint attachment areas ADR may be alternately arranged. In other words, a joint attachment area ADR may be disposed between a pair of adjacent lattice pattern areas LPR, and a lattice pattern area LPR may be disposed between a pair of adjacent joint attachment areas ADR.

The lattice pattern areas LPR may assist with the bending of the first and second pattern support areas 2120 and 2130. Each of the lattice pattern areas LPR may include a lattice pattern, in which a plurality of slits SL penetrate the support plate 2100 in the third direction DR3 and are spaced apart from one another. For example, the slits SL may have a rectangular shape having long sides in the second direction DR2 and short sides in the first direction DR1, but the invention is not limited thereto. The width of the slits SL may be substantially uniform when the first or second pattern support area 2120 or 2130 is not bent. However, when the first or second pattern support area 2120 or 2130 is bent, the width of the slits SL may increase in parts of the first and/or second pattern support area 2120 and/or 2130 that are bent. For example, in a case where the first or second pattern support area 2120 or 2130 is bent, the width of the slits SL may increase, and as a result, the first and/or second pattern support area 2120 and/or 2130 may be widened and may thus become easily bendable.

The joint attachment areas ADR may provide space where joints SG of each of the second or third support members 2220 and 2230 are to be attached, on the bottom surface of the first and/or second pattern support area 2120 and/or 2130. As the slits SL are not disposed in the joint attachment areas ADR, the joint attachment areas ADR may have a flat shape.

The first support member 2210 may support the flat support area 2110. The first support member 2210 may be disposed on the bottom surface of the flat support area 2110 of the support plate 2100. The first support member 2210 may have substantially the same shape as the first area PNL_1 of the display panel PNL in a plan view. For example, the first support member 2210 may have a rectangular shape, a rectangle-like shape extending in the first and second directions DR1 and DR2 in a plan view, or another polygonal shape, but the present invention is not limited thereto. An air gap may be formed on a second side, in the third direction DR3, of the first support member 2210. As the air gap is formed below the first support member 2210, any impact applied to the display panel PNL may be alleviated or reduced. For example, in response to an object such as a pen dropping onto the first area PNL_1 of the display panel PNL, the air gap may absorb the impact from the object.

The first support member 2210 might not be provided, in which case, the bottom surface of the flat support area 2110 of the support plate 2100 may be exposed to the air gap. In other words, the air gap may be formed on a second side, in the third direction DR3, of the flat support area 2110 of the support plate 2100.

The second support member 2220 may support the first pattern support area 2120 of the support plate 2100. The second support member 2220 may be attached to the joint attachment areas ADR of the first pattern support area 2120. The second support member 2220 may overlap with the second area PNL_2 of the display panel PNL in the third direction DR3.

The third support member 2230 may support the second pattern support area 2130 of the support plate 2100. The third support member 2230 may be attached to the joint attachment areas ADR of the second pattern support area 2130. The third support member 2230 may overlap with the third area PNL_3 of the display panel PNL in the third direction DR3.

Referring to FIGS. 4 and 6, each of the second and third support members 2220 and 2230 may include a plurality of joints SG, which extend in the second direction DR2 and are spaced apart from one another in the first direction DR1. In other words, the second support member 2220 may include a group of a plurality of joints SG disposed to overlap with the second area PNL_2 of the display panel PNL and the first pattern support area 2120 of the support plate 2100, and the third support member 2230 may include a group of a plurality of joints SG disposed to overlap with the third area PNL_3 of the display panel PNL and the second pattern support area 2130 of the support plate 2100.

The joints SG may include attachment parts SGa and body parts SGb. The attachment parts SGa are in direct contact with the joint attachment areas ADR of the first or second pattern support area 2120 or 2130, and the body parts SGb are disposed below the attachment parts SGa. The attachment parts SGa may be parts of the joints SG that are adjacent to the joint attachment areas ADR of the first or second pattern support area 2120 or 2130. The joints SG may be disposed to overlap with the joint attachment areas ADR, but not with the lattice pattern areas LPR, in the third direction DR3. The attachment parts SGa and the body parts SGb may be integrally formed together; however, the present invention is not limited thereto. The attachment parts SGa may allow the joints SG to be attached to the support plate 2100. The body parts SGb may add rigidity to the joints SG.

The width, in the first direction DR1, of the joints SG may discontinuously change along the third direction DR3, i.e., in a direction toward the inside of the display panel PNL. For example, a width SGa_w, in the first direction DR1, of the attachment parts SGa may be less than a width SGb_w, in the first direction DR1, of the body parts SGb. The width, in the first direction DR1, of the joint attachment parts ADR to which the attachment parts SGa are to be attached may be substantially the same as the width SGb_w, in the first direction DR1, of the attachment parts SGa. The width SGb_w, in the first direction DR1, of the body parts SGb may be about 0.2 mm to about 1.5 mm, but the invention is not limited thereto. As illustrated in FIG. 6, in a plan view, the attachment parts SGa may have a rectangular shape with the width SGa_w in the first direction DR1. In a plan view, the body parts SGb may have a rectangular shape with the width SGb_w in the first direction DR1, and the attachment parts SGa may protrude from the body parts SGb in the third direction DR3. For example, the attachment parts SGa may protrude from the middle of the body parts SGb. However, the present invention is not limited thereto. In other words, the joints SG may have a "8" shape, but the present invention is not limited thereto.

Referring to FIG. 6, a first surface, in the third direction DR3, of a joint SG may be the top surface of the joint SG that is in direct contact with the bottom surface of a joint attachment area ADR of the support plate 2100, and a second surface, in the third direction DR3, of the joint SG may be the bottom surface of the joint SG that faces away from the bottom surface of the joint attachment area ADR of the support plate 2100 in the third direction DR3. For example, the top surface of the joint SG may be a first surface, in the third direction DR3, of an attachment part SGa of the joint SG, and the bottom surface of the joint SG may be a second surface, in the third direction DR3, of a body part SGb of the joint SG. For example, the joint SG may include a metal such as SUS304.

A plurality of joints SG may be arranged in the first direction DR1 to be spaced apart from one another. The distance between the joints SG may differ based on the joints SG. For example, the distance between body parts SGb of a pair of adjacent joints SG may be less than the distance between attachment parts SGa of the pair of adjacent joints SG.

For example, the body parts SGb of the pair of adjacent joints SG may be spaced apart from each other by as much as a (1_1)-th width W_1a, and the attachment parts SGa of the pair of adjacent joints SG may be spaced apart from each other by as much as a (1_2)-th width W_1b. The (1_1)-th width W_1a may be less than the (1_2)-th width W_1b. The (1_2)-th width W_1b may be substantially the same as the width, in the first direction DR1, of the lattice pattern areas LPR.

As the width SGa_w, in the first direction DR1, of the attachment parts SGa of the joints SG are relatively small, the width, in the first direction DR1, of the joint attachment areas ADR may also be relatively small, and the width, in the first direction DR1, of the lattice pattern areas LPR may be relatively large. Accordingly, as the ratio of the lattice pattern areas LPR to each of the first and second pattern support areas 2120 and 2130 of the support plate 2100 increases, the first and second pattern support areas 2120 and 2130 can be effectively bent. As a result, the first and second pattern support areas 2120 and 2130 can reduce stress applied to the display panel PNL and increase the reliability of the display device 1 by properly assisting with the behavior of the display panel PNL being bent in the bendable areas RA. In addition, as the width SGb_w, in the first direction DR1, of the body parts SGb of the joints SG is relatively large, the joints SG can effectively support the display panel PNL by reinforcing the rigidity of the attachment parts SGa with a relatively small width (i.e., the width SGa_w) in the first direction DR1.

As the width SGa_w, in the first direction DR1, of the attachment parts SGa of the joints SG is relatively small, the width, in the first direction DR1, of the joint attachment areas ADR and the attachment area of the joints SG to the support plate 2100 may also be relatively small. Thus, as the attachment area of the joints SG to the support plate 2100 decreases, it is desirable to increase stability by increasing an adhesive force for the joints SG not to be separated from the support plate 2100. Accordingly, the joints SG and the support plate 2100 may be integrally formed without an adhesive layer therebetween. For example, in a case where the support plate 2100 includes a metal, the support plate 2100 and the joints SG may be integrally formed by welding the bottom surfaces of the joint attachment areas ADR of the support plate 2100 and the top surfaces of the joints SG together. In addition, in a case where the support plate 2100 includes a polymer material, the support plate 2100 and the joints SG may be integrally formed by applying heat to the bottom surfaces of the joint attachment areas ADR of the support plate 2100 and the top surfaces of the joints SG to thermally cure the support plate 2100. In a case where the support plate 2100 and the joints SG are integrally formed, the joints SG may protrude toward a second side, in the third direction DR3, of the support plate 2100, as illustrated in FIG. 4, and the boundaries between the support plate 2100 and the joints SG may be unnoticeable.

The behaviors of the support plate 2100 and the joints SG in the bendable areas RA will hereinafter be described.

Figure 7:
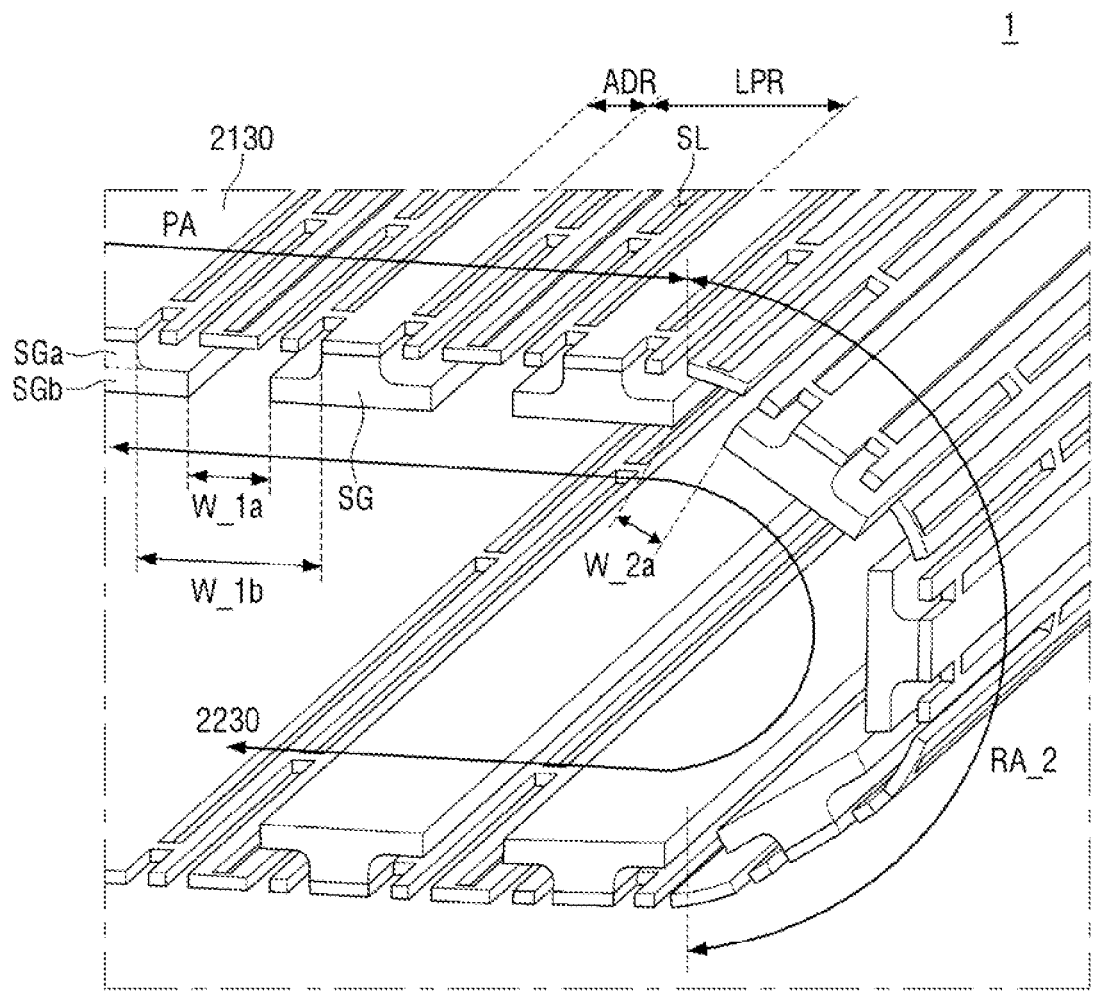
FIG. 7 is a perspective view of the support module in a bendable area of the display device of FIG. 1.
Figure 8:
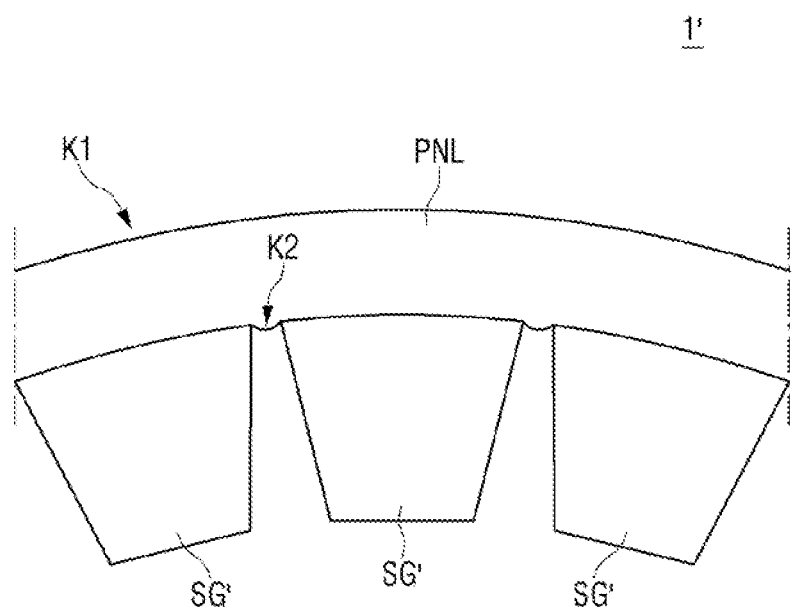
FIG. 8 is a side view illustrating the shape of a display panel being bent in a bendable area of a display device according to a comparative example and the shape of joints of the display device according to the comparative example.
Figure 9:
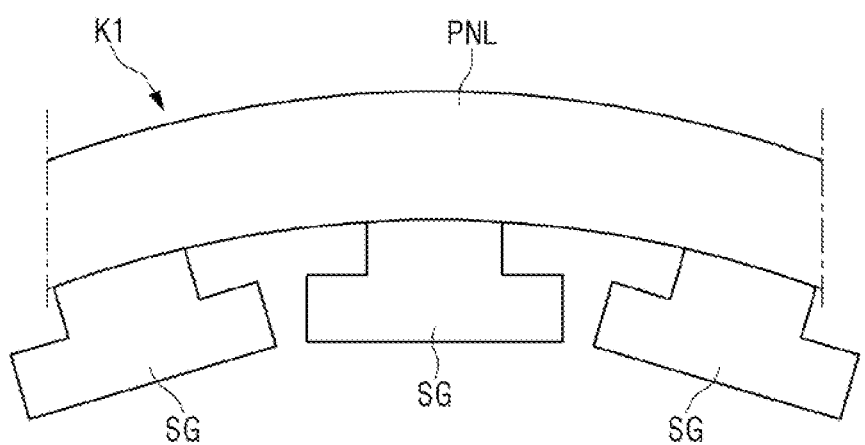
FIG. 9 is a side view illustrating the shape of the display panel being bent in a bendable area of the display device of FIG. 1 and the shape of joints of the display device of FIG. 1.

FIG. 7 is a perspective view of the support module in one of the bendable areas of the display device of FIG. 1. FIG. 8 is a side view illustrating the shape of a display panel being bent in a bendable area of a display device according to a comparative example and the shape of joints of the display device according to the comparative example. FIG. 9 is a side view illustrating the shape of the display panel being bent in one of the bendable areas of the display device of FIG. 1 and the shape of joints of the display device of FIG. 1.

Referring to FIG. 7, the joints SG of the display device 1 may be spaced apart from one another in the bendable areas RA by as much as a (2_1)-th width W_2a. As the behavior of the joints SG is the same in both the first and second bendable areas RA_1 and RA_2, the behavior of the joints SG in the second bendable area RA_2 will hereinafter be described for convenience, while the description for the behavior of the first bendable area RA_1 may be omitted.

The distance between the body parts SGb of the joints SG may be less in the bendable areas RA where the display panel PNL is bent than in the flat area PA.

For example, in the flat area PA, since the width SGb_w, in the first direction DR1, of the body parts SGb of the joints SG is greater than the width SGa_w, in the first direction DR1, of the attachment parts SGa of the joints SG, the distance between the body parts SGb of the joints SG, i.e., the (1_1)-th width W_1a, may be less than the distance between the attachment parts SGa of the joints SG, i.e., the (1_2)-th width W_1b. In response to the display device 1 being slid open so that the joints SG move from the flat area PA to the second bendable area RA_2, the distance between the body parts SGb of the joints SG may change from the (1_1)-th width W_1a to a (2_1)-th width W_2a, and the (2_1)-th width W_2a may be less than the (1_1)-th width W_1a.

If the width SGb_w, in the first direction DR1, of the body parts SGb of the joints SG is less than the width SGa_w, in the first direction DR1, of the attachment parts SGa of the joints SG, the (1_1)-th and (2_1)-th widths W_1a and W_2a may widen excessively so that the joints SG may be distorted in the bendable areas RA due to an excessive increase in the degree of freedom of movement of the joints SG. Due to the distortion of the joints SG, stress may be additionally applied to the display panel PNL, and thus, the reliability of the display device 1 may decrease. Accordingly, the distortion of the joints SG can be prevented by setting the width SGb_w, in the first direction DR1, of the body parts SGb of the joints SG to be greater than the width SGa_w, in the first direction DR1, of the attachment parts SGa of the joints SG to control the freedom of movement of the joints SG.

Referring to FIGS. 8 and 9, a display device 1' differs from the display device 1 in that the top surfaces of joints SG' that are attached to the bottom surface of a display panel PNL have a larger width in the first direction DR1 than the bottom surfaces of the joints SG'. For convenience, a support plate 2100 is not illustrated in FIG. 8.

Referring to FIG. 8, as the width, in the first direction DR1, of the top surfaces of the joints SG' of the display device 1' is relatively large, local curvature parts may be formed in bendable areas RA so that stress may be applied to the display panel PNL. For example, the display panel PNL may generally have a first curvature K1 in the bendable areas RA, but local curvature parts having a second curvature K2 may be formed between the joints SG' so that stress applied to the display panel PNL may increase. For example, the second curvature K2 may be at least three times the first curvature K1.

On the contrary, referring to FIG. 9, as the width, in the first direction DR1, of the top surfaces of the joints SG of the display device 1 is relatively small, no local curvature parts may be formed between the joints SG in the bendable areas RA, and thus, stress applied by the local curvature parts to the display panel PNL can be prevented.

Display devices according to an embodiment of the present invention will hereinafter be described, focusing mainly on the differences with the display device 1. Like reference numerals may indicate like elements through the disclosure, and thus, detailed descriptions thereof may be omitted to prevent redundant descriptions.

Figure 10:
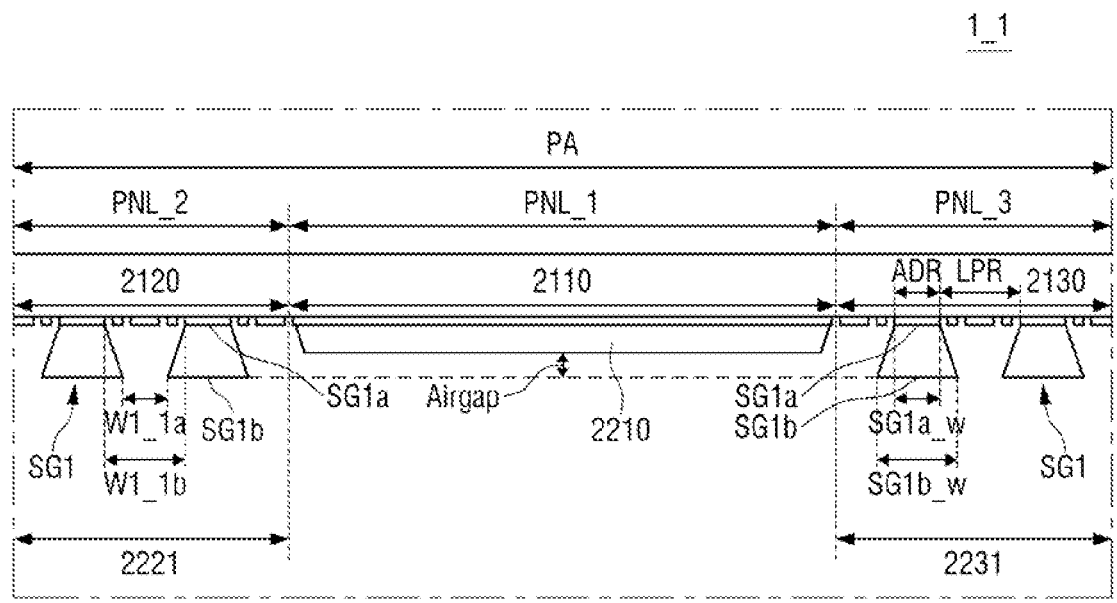
FIG. 10 is a cross-sectional view illustrating a display panel and a support module of a display device according to an embodiment of the present invention are stacked.
Figure 11:
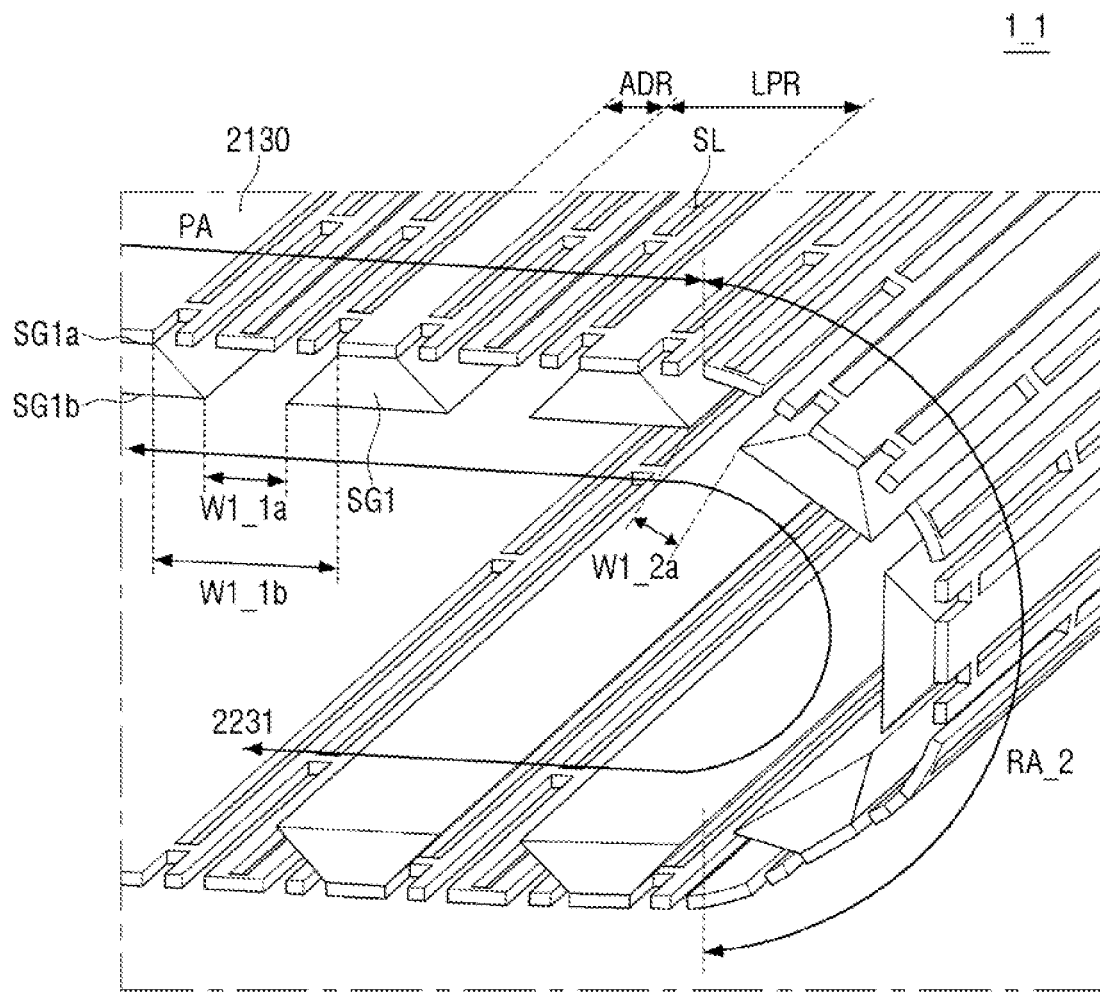
FIG. 11 is a perspective view of the support module of the display device of FIG. 10.

FIG. 10 is a cross-sectional view illustrating a display panel and a support module of a display device according to an embodiment of the present invention. FIG. 11 is a perspective view of the support module of the display device of FIG. 10.

Referring to FIGS. 10 and 11, the width, in a first direction DR1, of joints SG1 of a display device 1_1 may continue to increase in a direction toward a second side in the third direction DR3 from a first side opposite to the second side. For example, the joints SG1 of the display device 1_1 may have a trapezoidal shape with a longer lower base than its upper base, in a first direction DR, in a cross-sectional view.

The joints SG1 may have top surfaces SG1a, which are in direct contact with joint attachment areas ADR of a support plate 2100, and bottom surfaces SG1b, which are opposite to the top surfaces SG1a, and a width SG1a_w, in the first direction DR1, of the top surfaces SG1a may be less than a width SG1b_w, in the first direction DR1, of the bottom surfaces SG1b. Accordingly, the distance between the bottom surfaces SG1b of adjacent joints SG1, i.e., a (1_1)-th width W1_1a, may be less than the distance between the top surfaces SG1a of adjacent joints SG1, i.e., a (1_2)-th width W1_1b.

The bottom surfaces of the joints SG1 in the bendable areas RA may be spaced apart from one another by as much as a (2_1)-th width W1_2a. The (2_1)-th width W1_2a may be less than the (1_1)-th width W1_1a.

Referring to FIG. 11, the joints SG1 may have, for example, a trapezoidal shape in a cross-sectional view. Accordingly, the fabrication of the joints SG1 can be facilitated.

Figure 12:
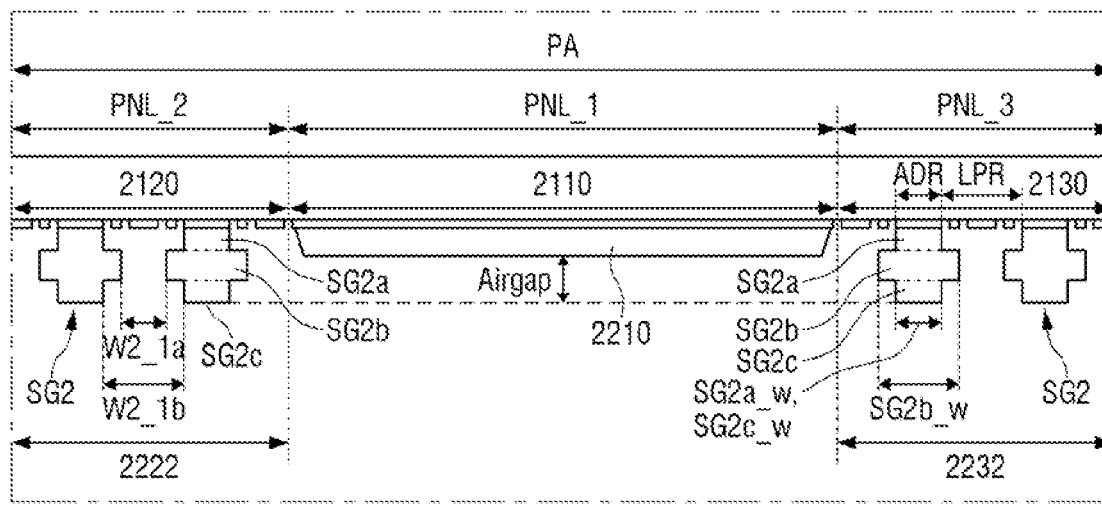
FIG. 12 is a cross-sectional view illustrating a display panel and a support module of a display device according to an embodiment of the present invention.
Figure 13:
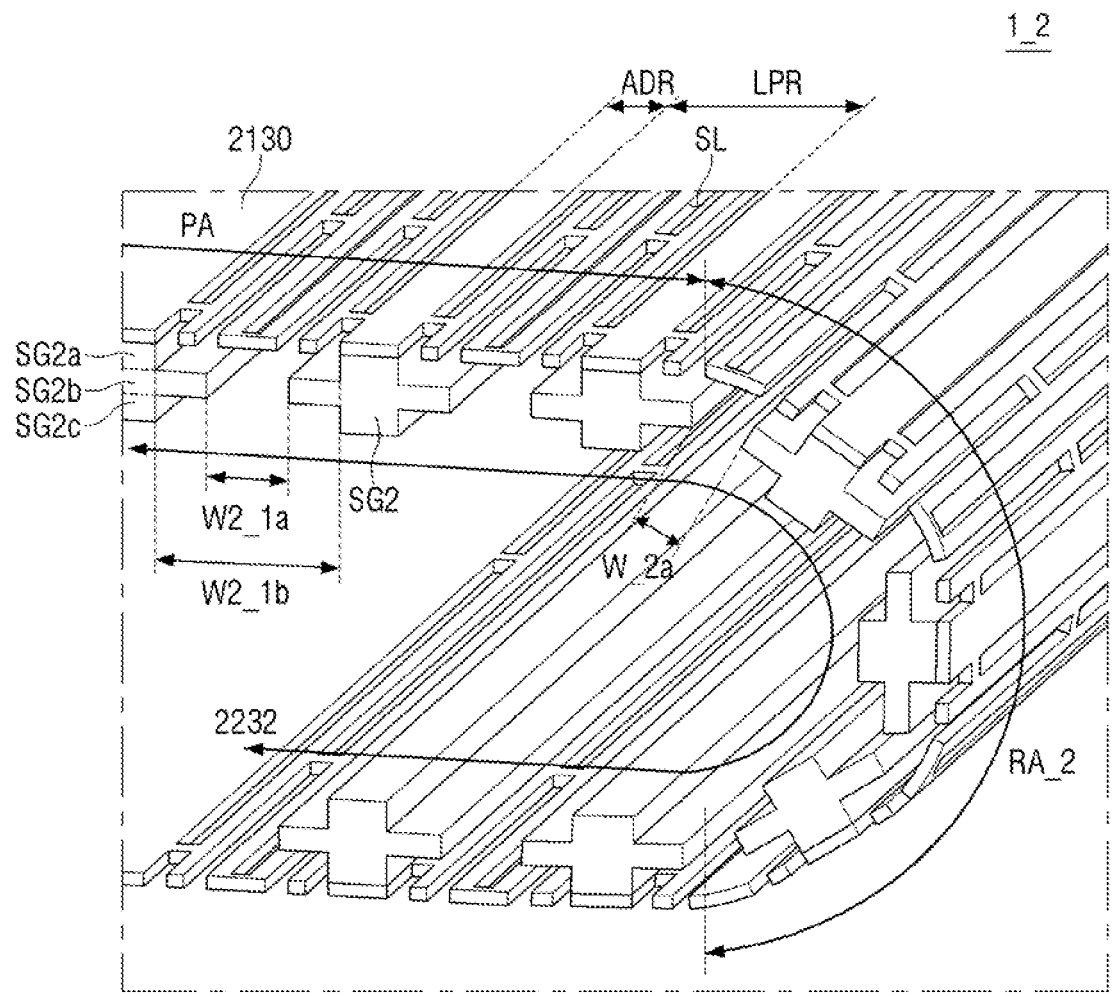
FIG. 13 is a perspective view of the support module of the display device of FIG. 12.

FIG. 12 is a cross-sectional view illustrating a display panel and a support module of a display device according to an embodiment of the present invention. FIG. 13 is a perspective view of the support module of the display device of FIG. 12.

Referring to FIGS. 12 and 13, the width, in a first direction DR1, of joints SG2 of a display device 12 may increase and then decrease in a direction toward a second side in a third direction DR3 from a first side opposite to the second side. In addition, neither the increase nor the decrease in width is gradually. For example, the joints SG2 of the display device 12 may have a cross shape in a cross-sectional view.

The joints SG2 may include attachment parts SG2a and body parts SG2b and may further include protruding parts SG2c, which are disposed below the body parts SG2b. For example, the body parts SG2b may between the attachment parts SG2a and the protruding parts SG2c. The protruding parts SG2c may be parts of the joints SG2 that protrude from the body parts SG2b in the third direction DR3 away from the display panel PNL. For example, the protruding parts SG2c may protrude from the middle of the body parts SG2b.

A width SG2c_w, in the first direction DR1, of the protruding parts SG2c may be less than a width SG2b_w, in the first direction DR1, of the body parts SG2b. The width SG2c w, in the first direction DR1, of the protruding parts SG2c may be substantially the same as a width SG2a_w, in the first direction DR1, of the attachment parts SG2a, but the present invention is not limited thereto. For example, the width SG2c_w, in the first direction DR1, of the protruding parts SG2c may be less than or greater than the width SG2a_w, in the first direction DR1, of the attachment parts SG2a.

The width SG2b w, in the first direction DR1, of the body parts SG2b may be greater than each of the width SG2a_w, in the first direction DR1, of the attachment parts SG2a and the width SG2c_w, in the first direction DR1, of the protruding parts SG2c. Accordingly, the distance between the body parts SG2b of adjacent joints SG2, i.e., a (1_1)-th width W2_1a, may be less than the distance between the attachment parts SG2a of adjacent joints SG2, i.e., a (1_2)-th width W2_1b.

Referring to FIG. 13, as the protruding parts SG2c are provided in the joints SG2, the rigidity of the joints SG2 can be further reinforced, and thus, the width SG2b_w, in the first direction DR1, of the body parts SG2b can be reduced.

The body parts SG2b of the joints SG2 may be spaced apart from one another by as much as a (2_1)-th width W2_2a. The (2_1)-th width W2_2a may be less than the (1_1)-th width W2_1a.

Figure 14:
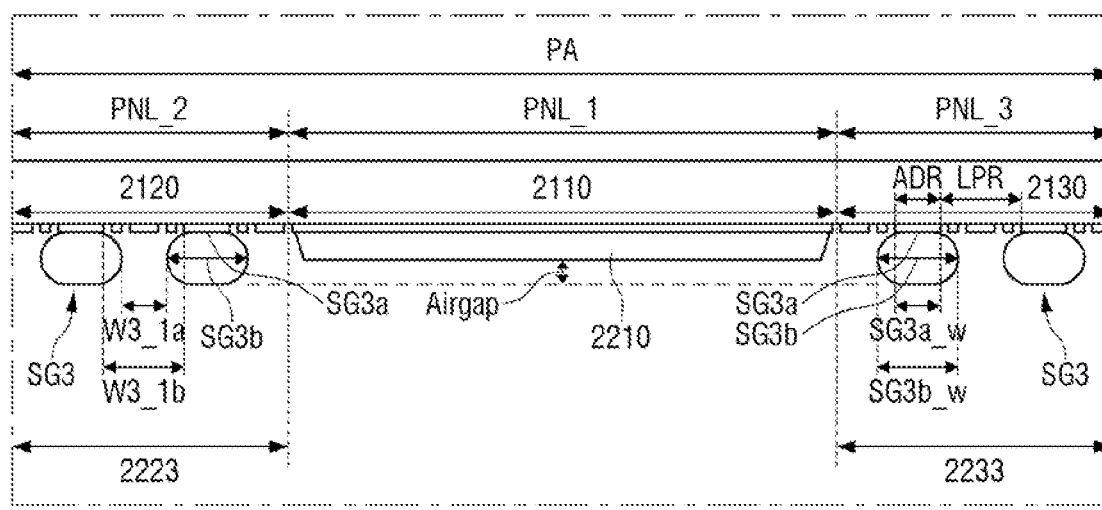
FIG. 14 is a cross-sectional view illustrating a display panel and a support module of a display device according to an embodiment of the present invention.
Figure 14:
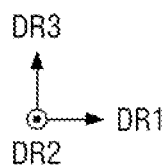
Figure 15:
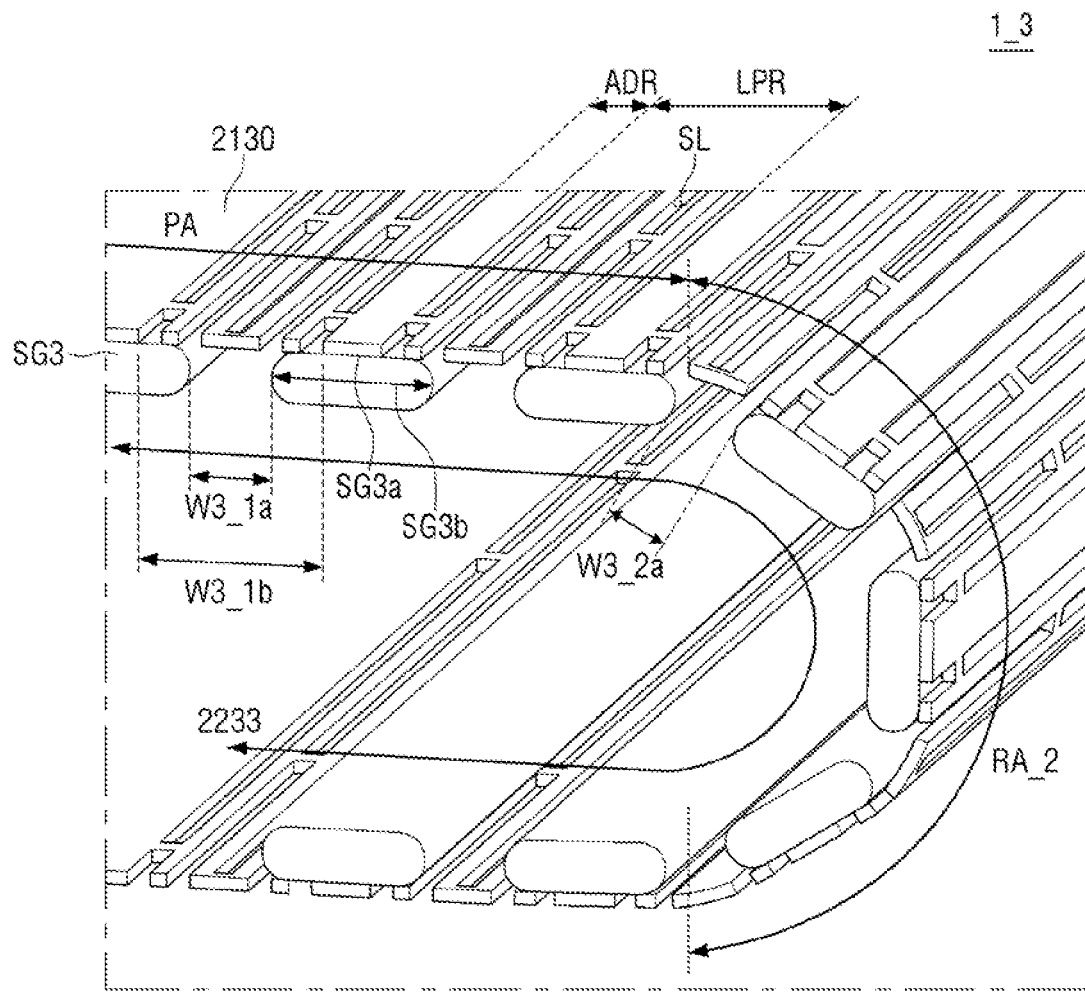
FIG. 15 is a perspective view of the support module of the display device of FIG. 14.

FIG. 14 is a cross-sectional view illustrating a display panel and a support module of a display device according to an embodiment of the present invention. FIG. 15 is a perspective view of the support module of the display device of FIG. 14.

Referring to FIGS. 14 and 15, the width, in a first direction DR1, of joints SG3 of a display device 1_3 may gradually continue to increase and then decrease in a direction toward a second side in a third direction DR3 from a first side opposite to the second side. For example, the joints SG3 of the display device 13 may have a rectangular shape with rounded corners, e.g., an elliptical shape, in a cross-sectional view.

The joints SG3 may have a minimum width SG3a_w in the first direction DR1 and may include edge parts SG3a, which are in direct contact with joints attachment areas ADR of a support plate 2100, and middle parts SG3b, which have a maximum width SG3b_w in the first direction DR1.

Accordingly, the distance between the middle parts SG3b of adjacent joints SG3, i.e., a (1_1)-th width W3_1a, may be less than the distance between the edge parts SG3a of the adjacent joints SG3, i.e., a (1_2)-th width W3_1b.

Referring to FIG. 15, the joints SG3 may have, for example, an elliptical shape in a cross-sectional view.

Middle parts SG3b of joints SG3 in bendable areas RA may be spaced apart from one another by as much as a (2_1)-th width W3_2a. The (2_1)-th width W3_2a may be less than the (1_1)-th width W3_1a.

While the present invention has been described with reference to the embodiments thereof, it will be understood by those of ordinary skill in the art that various changes in form and detail may be made thereto without departing from the spirit and scope of the present invention.

What is claimed is:
1. A display device comprising:
a display panel including a flat area and bendable areas, which are adjacent to the flat area in a first direction, wherein the display panel is configured to be bendable; and a support module disposed on the display panel, wherein the support module supports the display panel,
wherein
the support module includes a support plate and a plurality of joints, wherein the support plate is disposed to overlap with the flat area and the bendable areas and includes a plurality of lattice pattern areas including lattice patterns, and wherein the plurality of joints are disposed on a bottom surface of the support plate, are disposed to overlap with the bendable areas, and are spaced apart from one another in the first direction,
each of the plurality of joints has a top surface and a bottom surface, wherein the top surface is disposed on the bottom surface of the support plate, and the bottom surface is opposite to the top surface, and
a width, in the first direction, of each of the top surfaces of the plurality of joints is less than a width, in the first direction, of each of the bottom surfaces of the plurality of joints.

2. The display device of claim 1, wherein
the support plate includes a flat support area and pattern support areas, wherein the flat support area overlaps with the flat area of the display panel, and wherein the pattern support areas overlap with the bendable areas of the display panel, and
each of the pattern support areas includes the plurality of lattice pattern areas and joint attachment areas, wherein each of the pattern support areas include the lattice patterns, and wherein the joint attachment areas are disposed between the plurality of lattice pattern areas.

3. The display device of claim 2, wherein
each of the lattice patterns includes a plurality of slits, which penetrate the support plate, and
the plurality of joints overlap with the joint attachment areas, but not with the plurality of lattice pattern areas.

4. The display device of claim 2, wherein the support plate includes a metal or a polymer material.

5. The display device of claim 4, wherein the support plate has a thickness of about 0.05 mm to about 0.3 mm.

6. The display device of claim 1, wherein
the joints include attachment parts and body parts, wherein the attachment parts are adjacent to the support plate, and where the body parts are disposed below the attachment parts,
wherein a width, in the first direction, of the attachment parts is substantially the same as a width, in the first direction, of the top surfaces of the joints, and
wherein a width, in the first direction, of the body parts is substantially the same as a width, in the first direction, of the bottom surfaces of the joints.

7. The display device of claim 6, wherein
the body parts of the plurality of joints are spaced apart from one another by a (1_1)-th width in the flat area of the display panel, and
the attachment parts of the plurality of joints are spaced apart from one another by a (1_2)-th width, which is greater than the (1_1)-th width.

8. The display device of claim 7, wherein the body parts of the plurality of joints are spaced apart from one another by a (2_1)-th width, which is less than the (1_1)-th width, as the support plate is being bent in the bendable areas.

9. The display device of claim 6, wherein the width, in the first direction, of the attachment pails is about 0.2 mm to about 1.5 mm.

10. A display device comprising:
a display panel including a first area and a second area, which is disposed on a first side, in a first direction, of the first area; and
a support module disposed on a first surface of the display panel,
wherein
the support module includes a support plate and a plurality of joints, wherein the support plate is disposed to overlap with the first and second areas, includes lattice patterns, and extends in the first direction and a second direction crossing the first direction, wherein the plurality of joints are integrally formed with the support plate and protrude from the support plate in a third direction substantially perpendicular to the first and second directions, wherein the plurality of joints overlap with the second area, extend in the second direction, and are spaced apart from one another in the first direction,
wherein the lattice patterns of the support plate are disposed between the plurality of joints,
wherein the joints have top surfaces and bottom surfaces, wherein the top surface are interfaces between the support plate and the plurality of joints, and the bottom surfaces are opposite to the top surfaces in the third direction, and
wherein a width, in the first direction, of the top surfaces is less than a width, in the first direction, of the bottom surfaces.

11. The display device of claim 10, wherein
each of the lattice patterns includes a plurality of slits, which penetrate the support plate, and
the joints do not overlap with the lattice patterns.

12. The display device of claim 10, wherein the support plate includes a metal or a polymer material.

13. The display device of claim 12, wherein the support plate has a thickness of about 0.05 mm to about 0.3 mm.

14. The display device of claim 10, wherein
the joints include attachment parts and body parts, wherein the attachment parts are adjacent to the support plate, and the body parts are disposed on the attachment parts,
a width, in the first direction, of the attachment parts is substantially the same as a width, in the first direction, of the top surfaces of the joints, and
a width, in the first direction, of the body parts is substantially the same as a width, in the first direction, of the bottom surfaces of the joints.

15. The display device of claim 14, wherein a distance between the body parts of the joints is less than a distance between the attachment parts of the joints.

16. The display device of claim 15, wherein the distance between the body parts of the joints is less in a bent area of the display panel than in an area of the display panel that is not bent.

17. The display device of claim 10, wherein
the display panel further includes a third area and a fourth area, wherein the third area is disposed on a second side, opposite the first side, of the first area, and the fourth area is disposed on a third side, in the second direction, of the first area,
the support plate is disposed to overlap with the first, second, and third areas, and
the joints are disposed to overlap with the second and third areas.

18. A display device comprising:

a display panel;

a support plate attached on a bottom surface of the display panel, wherein the support plate includes lattice patterns; and a plurality of joints integrally formed with the support plate and protruding from the support plate, wherein the joints are spaced apart from one another, wherein the joints do not overlap with the lattice patterns of the support plate and have top surfaces and bottom surfaces, wherein the top surfaces are interfaces between the support plate and the joints, and the bottom surfaces are opposite to the top surfaces, and a width of each of the top surfaces is less than a width of each of the bottom surfaces.

19. The display device of claim 18, wherein the support plate includes a metal or a polymer material and has a thickness of about 0.05 mm to about 0.3 mm.

20. The display device of claim 18, wherein the bottom surfaces of the joints are spaced apart from one another by a (1_1)-th width, and the top surfaces of the joints are spaced apart from one another by a (1_2)-th width, which is greater than the (1_1)-th width.

\* \* \* \* \*